(12) United States Patent
Renou et al.

(10) Patent No.: US 7,219,040 B2
(45) Date of Patent: May 15, 2007

(54) METHOD AND SYSTEM FOR MODEL BASED CONTROL OF HEAVY DUTY GAS TURBINE

(75) Inventors: Stephane Renou, Clifton Park, NY (US); Minesh Ashok Shah, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 678 days.

(21) Appl. No.: 10/065,641

(22) Filed: Nov. 5, 2002

(65) Prior Publication Data

US 2004/0088060 A1 May 6, 2004

(51) Int. Cl.
G06G 7/48 (2006.01)

(52) U.S. Cl. .................. 703/6; 703/2; 703/7; 701/100; 700/177; 700/287; 702/182

(58) Field of Classification Search .................. 707/6, 707/7; 700/7, 177, 31, 287; 703/6, 7, 8; 702/31; 701/100
See application file for complete search history.

(56) References Cited

U.S. PATENT DOCUMENTS

| | | | | |
|---|---|---|---|---|
| 5,457,625 | A | * | 10/1995 | Lim et al. ..................... 700/29 |
| 5,633,800 | A | * | 5/1997 | Bankert et al. ............. 700/177 |
| 5,873,251 | A | * | 2/1999 | Iino ............................. 60/660 |
| 6,055,483 | A | * | 4/2000 | Lu ............................... 702/31 |
| 6,063,129 | A | | 5/2000 | Dadd et al. |
| 6,226,974 | B1 | | 5/2001 | Andrew et al. |
| 6,591,225 | B1 | * | 7/2003 | Adelman et al. ............ 702/182 |
| 6,681,155 | B1 | * | 1/2004 | Fujita et al. ................. 700/287 |
| 6,823,253 | B2 | * | 11/2004 | Brunell ....................... 701/100 |
| 6,823,675 | B2 | * | 11/2004 | Brunell et al. ................ 60/773 |
| 2002/0120352 | A1 | * | 8/2002 | Stothert et al. ............... 700/31 |
| 2002/0123870 | A1 | * | 9/2002 | Chan et al. .................... 703/7 |
| 2003/0195665 | A1 | * | 10/2003 | Cutler ......................... 700/266 |

FOREIGN PATENT DOCUMENTS

WO    WO 02/01350 A2    1/2002

OTHER PUBLICATIONS

"Robust design through the use of a hybrid genetic algorithm", Hacker et al, Proceedings of DETC'02, DETC2002/DAC-34108.*
"Improving the Aircraft Design Process Using Web-based Modeling and Simulation", Reed et al, ACM Transactions of Modeling and Computer Simulation, vol. 10, No. 1 Jan. 2000.*
"Computational Simulation of Gas Turbines: Part 1—Foundations of Component-Based Models", Reed et al, ASME 99-GT-346, 1999 ASME.*

(Continued)

*Primary Examiner*—Fred Ferris
(74) *Attorney, Agent, or Firm*—Fletcher Yoder

(57) ABSTRACT

A method and system of designing the operations and controls of a gas turbine, includes generating an operations model for the gas turbine including at least one objective function and defining operations and control constraints for the operations model of the gas turbine. An online dynamic optimizer/controller dynamically optimizes and controls operation of the gas turbine using model based control based on the operations model and the operations and control constraints. The model based control may include model predictive control.

36 Claims, 11 Drawing Sheets

OTHER PUBLICATIONS

Perry's Chemical Engineers' Handbook, 7th Edition, McGraw-Hill, 1997, pp. 8-25.*

"Gas Turbine Engine Controller Design Using Multiobjective Genetic Algorithms", Chipperfield et al, GAES: Innovations and Applications, Sep. 1995, Pun. No. 414, IEE, 1995.*

"Model Predictive Control and the Optimization of Power Plant Load While Considering Lifelong Consumption", Gallestey et al, IEEE 0885-8950/02, IEEE 2002.*

Fabio Bozza et al., "A Methodology for Establishing Optimal Part-Load Operation of Industrial Gas Turbines" Universita di Napoli (Italy), Jun. 10-13, 1996, pp. 1-10.

G.P. Liu et al., "Design and Implementation of an Adaptive Predictive Controller for Combustor $NO_x$ Emissions", Alstom Energy Technology Cener, Cambridge, UK, Jan. 26, 1999, pp. 485-491.

R. A. Perez, "Model Reference Control of a Gas Turbine Engine", Mechanical Engineering Department, University of Wisconsin, Milwaukee, 1MechE 1996, pp. 292-294.

R. Bettocchi et al., "Resolution Method for Gas Turbine Mathematical Models", IGTI-vol. 9, ASME Congen-turbo, ASME 1994, Istituto di Macchine, Istituto di Matematica Generale e Finanziaria and Universita di Bologna, Bologna, Italy, pp. 361-369.

C.D. Kong, "Real Time Linear Simulation and Control for the Small Aircraft turbojet Engine", Chosun University, Dept. of Aerospace Engineering, Kwangiu, Republic of Korea, ASME Asia 97 Congress & Exhibition, Singapore, 9/30-10/197, pp. 1-8.

* cited by examiner

Compressor Inlet Model $$\dot{m}_{comp} c_p T_{comp,in} = \dot{m}_{bleed} c_p T_{bleed} + (\dot{m}_{comp} - \dot{m}_{bleed}) c_p T_{amb}$$

$$P_{comp,in} = P_{amb} - \Delta P_{inlet}$$

$$\Delta P_{inlet} = f(\dot{m}_{comp})$$

$$Specific\ Humidity = \frac{0.622 * (Relative\ Humidity)}{\left(\frac{P_{amb}}{P_{dry}} - Relative\ Humidity\right)}$$

← 502

Compressor Model $$\dot{m}_{comp,corrected} = f(X_c, N_c)$$

$$\eta_{comp} = f(X_c, TNH_{cor}, SII)$$

$$\dot{m}_{comp} = \dot{m}_{comp,corrected} \frac{\sqrt{\frac{T_{comp,in}}{T_{ISO}}}}{\frac{P_{comp,in}}{P_{ISO}}} + f(SII)$$

$$T_{comp,exit} = \frac{T_{comp,in}}{\eta_{comp}} \left[ (X_c)^{\frac{\gamma-1}{\gamma}} - 1 \right] + T_{comp,in}$$

$$\dot{m}_{9th,stage} = f(X_c, N_c, IGV)$$
$$\dot{m}_{13th,stage} = f(X_c, N_c, IGV)$$
$$\dot{m}_{17th,stage} = f(X_c, N_c, IGV)$$
$$\dot{m}_{18th,stage} = f(X_c, N_c, IGV)$$

Compressor Model Continued $$\dot{m}_{nonchargeable} = \frac{C_d A P_{comp,exit}}{\sqrt{R T_{comp,exit}}} \left( \gamma^{1/2} \left( \frac{2}{\gamma+1} \right)^{\frac{\gamma+1}{\gamma-1}} \right)$$

$$\dot{m}_{discharge\,volume} = \dot{m}_{comp} - \dot{m}_{9th,stg} - \dot{m}_{13th,stg} - \dot{m}_{17th,stg} - \dot{m}_{18th,stg} - \dot{m}_{nonchargeable}$$

$$\dot{P}_{comp,exit} = \frac{\dot{m}_{discharge\,volume} R T_{comp,exit}}{V_{discharge}} \qquad \longleftarrow 504$$

Since bleed flows are from the compressor to the turbine via some piping, a small lag is introduced in the flows to account for this:

$$\frac{d\dot{m}_{ith,stg\,bleed\,to\,turbine}}{dt} = \frac{\dot{m}_{ith,stg\,bleed\,from\,compressor} - \dot{m}_{ith\,stg\,bleed\,to\,turbine}}{\tau_{comp}}$$

Compressor Heat Soak Model $$\frac{dT_{metal}}{dt} = \frac{Q}{m_{metal} c_{p,metal}}$$

$$Q = h(T_{comp,avg} - T_{metal}) \qquad \longleftarrow 506$$

$$T_{comp,avg} = \frac{T_{comp,exit} + T_{9th,stg}}{2}$$

FIG. 5B

Compressor Model Continued

Compressor HP Calculation $CompressorHP = \dot{m}_{comp} c_p T_{comp,in} - \dot{m}_{9thstg} c_p T_{9thstg} - \dot{m}_{13thstg} c_p T_{13thstg} - \dot{m}_{17thstg} c_p T_{17thstg} - \dot{m}_{18thstg} c_p T_{18thstg} - (\dot{m}_{comp} - \dot{m}_{9thstg} - \dot{m}_{13thstg} - \dot{m}_{17thstg} - \dot{m}_{18thstg}) c_p T_{comp,exit}$ ←508

Combustor Model $T_{flame} = f(\dot{m}_{fuel}, \dot{m}_{comb}, T_{air,combin}, T_{fuel}, SH, P_{comp,exit})$ $\Delta P_{comb} = f(P_{comp,exit}, T_{comp,exit}, T_{flame}, SH)$ Combustor dynamics modeled with a lag for flame temperature and turbine inlet pressure:

$$\frac{dT_{flame,out}}{dt} = \frac{T_{flame,in} - T_{flame,out}}{\tau_{comb}}$$

$$\frac{dP_{turbine,in}}{dt} = \frac{(P_{comp,exit} - \Delta P_{comb}) - P_{turbine,in}}{\tau_{comb}}$$

| | |
|---|---|
| $\dot{m}_{comp}$ | Total mass flow from compressor |
| $T_{comp,in}$ | Temperature of air entering compressor |
| $\dot{m}_{bleed}$ | Mass flow of inlet bleed air |
| $T_{amb}$ | Ambient temperature |
| $P_{comp,in}$ | Inlet pressure to compressor |
| $\Delta P_{inlet}$ | Inlet pressure drop |
| $P_{amb}$ | Ambient pressure |
| $P_{dry}$ | Dry vapor pressure |
| $\dot{m}_{comp,corrected}$ | Corrected mass flow from compressor |
| $X_c$ | Pressure ratio across compressor |
| $N_c$ | Corrected speed |
| $TNH_{cor}$ | Corrected speed |
| $\eta_{comp}$ | Compressor efficiency |
| $c_p$ | Specific heat at constant pressure |
| $T_{comp,xd}$ | Compressor discharge temperature |
| $\gamma$ | Ratio of specific heats |
| IGV | Inlet guide vane angle |
| $P_{ISO}$ | Pressure at ISO conditions |
| $T_{ISO}$ | Temperature at ISO conditions |
| $\dot{m}_{nonchargeable}$ | Mass flow from compressor directly to turbine inlet |
| R | Gas constant |
| $C_dA$ | Effective area |
| $\dot{m}_{dischargevolume}$ | Mass flow in the compressor discharge plenum |
| $V_{discharge}$ | Volume of compressor discharge plenum |
| $\tau_{comp}$ | Compressor time constant |
| Q | Heat flux |
| h | Heat transfer coefficient |
| $m_{metal}$ | Compressor mass |
| $c_{p,metal}$ | Heat capacity of compressor |
| CompressorHP | Horsepower absorbed by compressor |
| $T_{flame}$ | Flame temperature |
| $\Delta P_{comb}$ | Combustor pressure drop |
| $\tau_{comb}$ | Combustor time constant |
| $P_{turbine,in}$ | Turbine inlet pressure |

Fig. 6 minimize $[Y_{future} - Y_{setpoint}]^2 + \Delta U^2$ with respect to $Y_{lb} \leq Y_{future} \leq Y_{ub}$ $\Delta U_{lb} \leq \Delta U_{future} \leq \Delta U_{ub}$ $g(Y_{future}) \leq Constraints$

Quadratic Programming Problem minimize $\Delta U^T Q \Delta U + f'\Delta U$ with respect to $C\Delta U_{future} \leq C_{ub}$

METHOD AND SYSTEM FOR MODEL BASED CONTROL OF HEAVY DUTY GAS TURBINE

BACKGROUND OF THE INVENTION

This invention relates generally to a more efficient design of the operation and control of a gas turbine. More specifically, the present invention is directed to a method, system, and software for a model based control of a heavy duty gas turbine that integrates the design of the operations and the controls for the gas turbine.

Gas turbine behavior is generally described by highly non-linear models and its operation is limited by several operational constraints. Enforcement of the constraints is typically mandatory and good dynamic behavior throughout the operating space must be ensured. Generally, gas turbines are operated using pre-defined operating schedules which attempt to provide an optimal operating strategy. These operating schedules are validated using a dynamic simulation of the turbine with the operating schedule and a separately designed control system for operation of the turbine. Accordingly, the operation and control design are decoupled giving rise to several iterations in refining the operations and controls to achieve desired results. That is, the controls are separately designed to track a pre-defined operations strategy or schedule.

Accordingly, this separate design of the operations and controls together with simulations to verify the efficacy of the separate design gives rise to several inefficiencies. The operation and control are designed separately (and often substantially independently) and then coupled together giving rise to integration errors and other inconsistencies in the design process. For example, the introduction of a new constraint in either one of the operations or the controls requires that the other also be verified to ensure that it works with the new constraints. Likewise, any changes in the operational model (or schedule) requires that the operations and the controls be changed independently. Thereafter, simulations or other verifications need to be performed to ensure their compatibility. Accordingly, making any changes is a complex process since the changes have to be carefully coordinated in the design of both the operations and the control systems. Therefore, any specific changes requested by customers also need to be implemented using this cumbersome and relatively disjointed procedure whereby the operations and controls are separately redesigned and then coordinated by simulation or other verification to ensure the integrity of the changes introduced. Accordingly, it is difficult to expediently provide the specific changes that may be desired by specific customers.

Furthermore, the operational path has to be designed in advance which prevents the operational design from being optimized based on run time conditions or parameters. In addition, the steady state operational conditions are designed based an average machine case (or parameters) rather than optimized based on the specifics of each machine. Therefore, each specific machine cannot be easily optimized by using this apriori design of the operation path or schedule for the gas turbine. Likewise, dynamic stability assessment and disturbance rejection via coordinated control actions is not easy to accomplish. In addition, the complex interactions between independently designed operations and controls gives rise to maintenance problems since any maintenance related changes have to be properly coordinated between the operations and controls systems.

BRIEF DESCRIPTION OF THE INVENTION

In one aspect, the present invention provides a method of designing the operations and controls of a gas turbine, including: generating an operations model for the gas turbine including at least one objective function; defining operations and control constraints for the operations model of the gas turbine; and providing an online dynamic optimizer/controller that dynamically optimizes and controls operation of the gas turbine using model based control based on the operations model and the operations and control constraints.

In one aspect of the present invention, the model based control includes model predictive control.

In another aspect of the present invention, the optimizer/controller performs following steps in a loop: (A) estimating the current engine state and applicable constraints; (B) for a given control/simulation time period, determining a control action by optimizing an objective function based on the operation model while respecting the applicable constraints; (C) executing the control action determined in step (B). In one aspect, in step (B), determining a control action by optimizing an objective function includes predicting the gas turbine engine states and applicable constraints.

In one aspect of the present invention, the dynamic optimizer uses sensors for computing measured values of various engine states or parameters related to the operations of the gas turbine.

In another aspect, the dynamic optimizer/controller uses software sensors for estimating unmeasured values of other parameters based on the measured values.

In one aspect, the operations model comprises a multivariable nonlinear model.

In another aspect, the optimizer/controller approximates the non linear model with a set of piece wise linear models for prediction and/or optimization purposes.

In another aspect, the optimizer/controller reduces the risk of constraint violation by proactive control actions responsive to the model predictive control results.

In another aspect, the optimizer modifies the objective function and the constraints are modifiable online to optimize operational results and/or compliance with applicable constraints.

In a further aspect, the operations model is adjustable online based on the data from a specific machine.

In one aspect, the controller portion of the optimizer/controller is configured to perform the following steps iteratively: receiving sensor inputs of measured values and computing other nonmeasured values based on the measured values; adjusting the operations model based on the input measured values and/or the computed nonmeasured values; computing engine state and constraints predicted values over a prediction horizon based on the input measured values and/or the computed nonmeasured values and the operations model; using the engine state and constraints predicted values to evaluate the objective function and constraints in order to generate control actions over a control horizon.

In another aspect, the present invention provides a system for designing the operations and controls of a gas turbine, including: a computing unit with an input unit for generating an operations model for the gas turbine to include at least one objective function and for defining operations and controls constraints for the operations model of the gas turbine; and a dynamic online optimizer/controller config ured to dynamically optimize and control operation of the gas turbine using model based control based on the operations model and the operations and control constraints.

In one aspect of the system, the model based control comprises model predictive control.

In another aspect of the system, the optimizer/controller is configured to perform the following steps in a loop: (A) estimating the current engine state and applicable constraints; (B) for a given control/simulation time period, determining a control action by optimizing an objective function based on the operation model while respecting the applicable constraints; and (C) executing the control action determined in step (B). In one aspect, in step (B), determining a control action comprises predicting the gas turbine engine states and applicable constraints.

In another aspect, the system further includes sensors for measuring or computing measured values of various engine states or parameters related to the operations of the gas turbine. In a further aspect, the system further includes software sensors for estimating unmeasured values of other states or parameters based on the measured values.

In one aspect, the present invention provides a computer readable data storage medium having program code stored thereon for designing the operations and controls for a gas turbine, the program code configured to cause a computing system to perform the following steps: generating an operations model for the gas turbine include at least one objective function; defining operations and control constraints for the operations model of the gas turbine; providing an online dynamic optimizer/controller that dynamically optimizes and controls operation of the gas turbine using model based control based on the operations model and the operations and control constraints.

In one aspect of the programmed computer readable data storage medium, the model based control comprises model predictive control.

BRIEF DESCRIPTION OF THE DRAWINGS

The accompanying drawings, which are incorporated in and constitute a part of the specification, illustrate various embodiments of the invention, and, together with the general description given above and the detailed description of the various embodiments given below, serve to explain the principles of the invention.

FIGS. 5A–5C illustrate mathematical formulations that may be used to implement some of the models disclosed in FIG. 4.

FIG. 6 is a table disclosing the legends used in the mathematical equations disclosed in FIGS. 5A–5C.

DETAILED DESCRIPTION OF THE INVENTION

Figure 1:
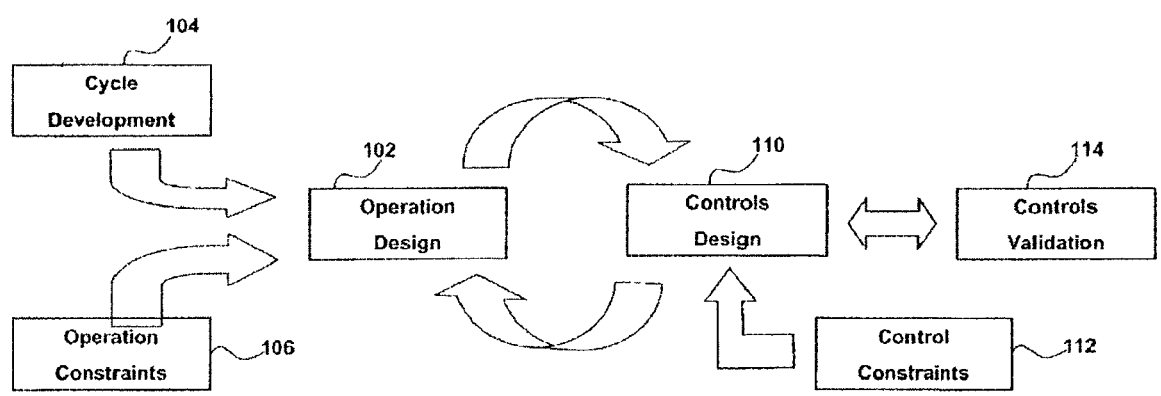
FIG. 1 is a block diagram illustrating a design process for the operations and controls of a gas turbine.

FIG. 1 is a block diagram illustrating a design process for the operations and controls of a gas turbine. An operation design process 102 defines operations schedules for operating a gas turbine. The operation design process 102 inputs operations related constraints 106 and an operations model developed in a model development process 104 (in which a thermodynamic model, both steady state and transient, of the gas turbine is developed that serves as the basis for the operations model). The operations design process 102 then generates the operation schedules based on the operations model and the operations constraints in order to optimize the operational performance of the gas turbine. Examples of operational constraints are provided further herein with respect to the discussion of the exemplary gas turbine model discussed further. A typical operations model (defined in the cycle development process 104) includes an objective function that is a transfer function that seeks to optimize the operational performance of the gas turbine for a given set of inputs. Typically, the operations model is a fairly complex nonlinear multi variable model. One limitation of the design of the operations model in this way is that the operations model is designed based on the parameters of a typical or average of a family of gas turbines for which the operations model is being designed. That is, the operations model is generally not easily customized for the parameters of a specific machine since such a customized operational design would be very expensive.

A control design process 110 designs a control structure and logic that controls the gas turbine operating according to the operation schedules that have been predefined in the operation design process 102. The controls design process 110 inputs control constraints 112 in designing the control structure and logic that controls the gas turbine in accordance with the operation schedules defined as part of the operations model and the operations and control constraints. Examples of control constraints are provided further herein with respect to the discussion of the exemplary gas turbine model discussed further herein. The control design must typically be validated in a control validation process 114 that validates that the controls are performing as designed.

The operations design process 102 and the controls design process 110 are then further refined iteratively to improve the operations model as well as the control structure and logic that optimizes the operations of the gas turbine. The controls validation process 114 also needs to be repeatedly (or frequently) performed to ensure that the control structure and logic functions perform as designed in the operations design 102 and controls design 110 processes. For example, the controls validation process verifies that the operations related parameters and objectives are being achieved while the operations and control constraints are not being violated. Likewise, the controls validation process 114 also ensures that the control structure and logic achieves adequate control of the gas turbine while respecting the limits imposed by the control constraints 112 and the operation constraints 106. Therefore, in this type of sequential design process, the controls are designed to follow a predefined operations strategy.

Figure 2:
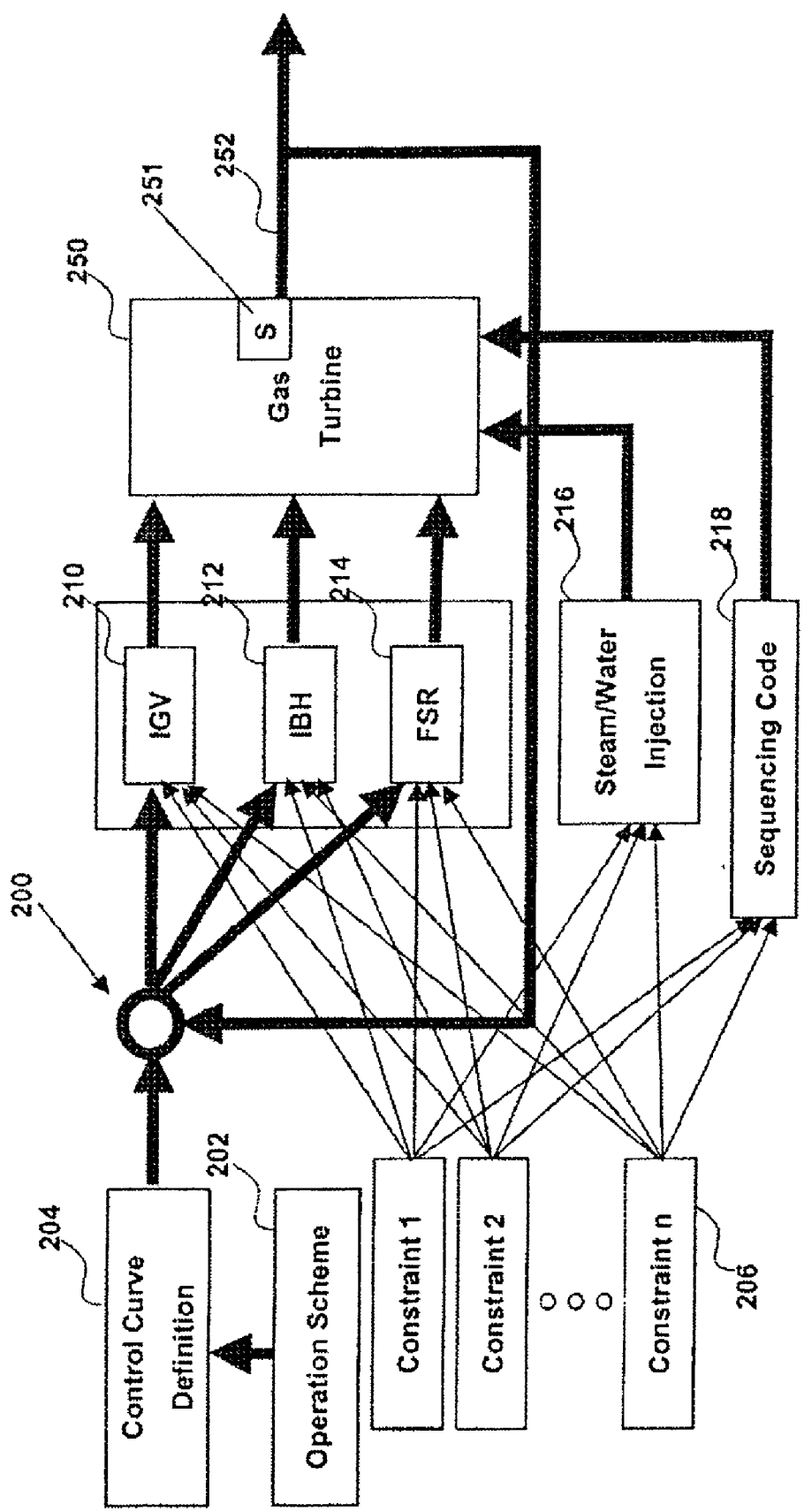
FIG. 2 is a block diagram illustrating a control structure for controlling operations of a gas turbine.

FIG. 2 illustrates a control structure including a controller 200, for controlling a gas turbine 250, designed in accordance with the design process discussed earlier herein with respect to FIG. 1. The operations model or scheme 202 designed by the operation design process 102 and the constraints 206 (both operation and control constraints) are used to define a control transfer function (or control curve) 204 that are used by the controller 200 to provide a feed forward control of the parameters used by the operation model 202 to control the gas turbine 250. The exemplary parameters controlled according to the operation model shown in FIG. 2 include the Inlet Guide Vane (IGV) angle 210, the Inlet Bleed Heat (IBH) 212, and a fuel flow related value, the Fuel Stroke Reference (FSR) 214. Each of these parameters are limited to bounds (both at steady state and during a transient state) that depend on one or more of the control and operation constraints 206.

In addition, the constraints 206 also limit the values (or change of values) of a steam/water injection unit 216 and a sequencing code unit 218 that executes the control logic code. Actual sensors 251 are provided to generate the sensor signals 252 which are fed back to the controller 200 so that the controller 200 can adjust the future control signals to the parameters controlled by the controller 200 in order to control the operation of the gas turbine 250.

Figure 3:
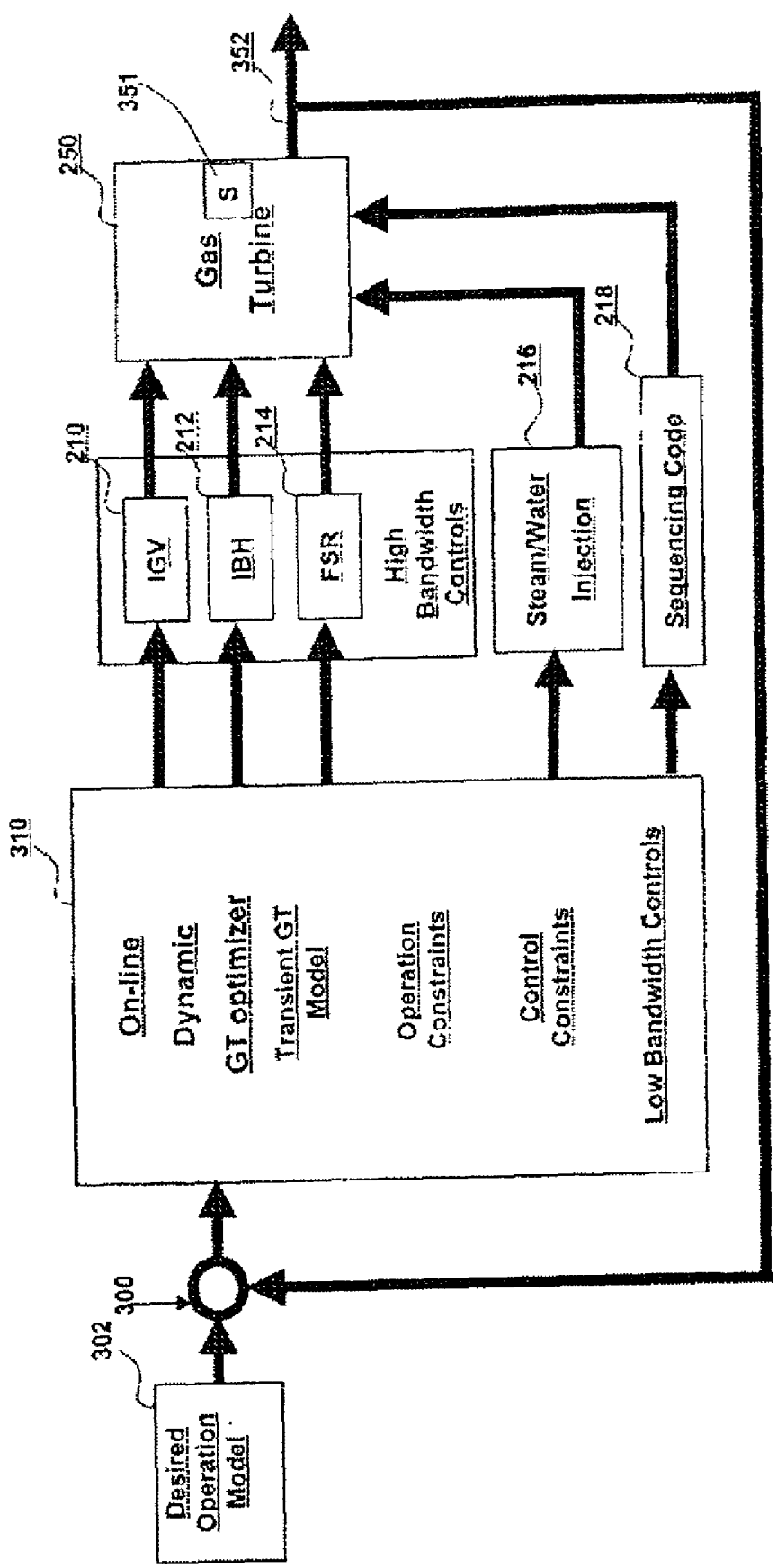
FIG. 3 is a block diagram illustrating the model based dynamic control of the gas turbine.

FIG. 3 is block diagram illustrating the model based dynamic control of the gas turbine 250 in accordance with one aspect of the present invention. It should be recognized that FIG. 3 is exemplary only with those skilled in the art recognizing various variations, modifications, or alternatives all which are considered a part of the present invention. Block 302 depicts a process in which an operations model of the gas turbine 250 is generated. The process 302 of generating the model includes defining objective functions that optimize the operation of the gas turbine 250 as well as defining relevant operations and control constraints. The process 302 typically would be implemented using a computing unit 300 with an input interface into which the objective function(s) and the relevant operations and controls constraints can be entered or partially derived based on rules.

A dynamic online optimizer/controller 310 inputs the operation model and the relevant operation and control constraints as well as other low bandwidth related controls. A sensor 351 provides measured values of gas turbine related engine states and constraints that are input to the online optimizer/controller 310 either directly or through a computing unit 300. As would be recognized by those skilled in the art, the computing unit 300 and the online optimizer/controller 310 are shown as being separate logically. In practice, they could be implemented on a same computing platform.

A sensor 351 is provided to measure various gas turbine engine state and constraint values and a signal 352 representative of the measured values is provided to the dynamic online optimizer/controller 310 either directly or through the computing unit 300. Software sensors are also provided in either the computing unit 300 or the dynamic optimizer/controller 310 that provide estimated values for unmeasured gas turbine engine states and/or constraints based on the measured values and other logic rules encoded in the software sensors.

The online dynamic optimizer/controller 310 provides a model based control of the gas turbine 250 that integrates the design of the operations scheme with the design of the controls. Therefore, the optimizer/controller 310 seeks to optimize the objective function of the operations model while respecting the applicable constraints by iteratively performing the following steps. (1) It receives the measured values representative of gas turbine engine states or constraints from the sensor 351 and also computes (or receives computed) values from the software sensor of nonmeasured values of engine states and constraints based on the measured values and the logic rules that are encoded in the software sensors. (2) The optimizer predicts the gas turbine engine state and constraints values over a prediction time horizon based on the measured and non measured values detected by the sensor 351 and the software sensors. (3) Based on the predicted values, the optimizer/controller evaluates the operations model to determine an appropriate control action for controlling the parameters that control the operation of the gas turbine over a control time period horizon. For example, the optimizer/controller 310 generates appropriate values for the IGV 210, the IBH 212, the fuel flow related value (FSR) 214, the steam/water injection unit 21 6, and the sequencing code 218 so that the operations of the gas turbine can run optimally based on the objective function(s) of the gas turbine.

As would be recognized by those skilled in the art, the prediction time horizon may be the same as the control time horizon or the two may be different from each other. Therefore, in one example, the dynamic optimization problem is solved once for each cycle of control action execution. Furthermore, the online optimizer/controller 310 coordinates the control action for the gas turbine 250 and ensures the steady state and transient performance of the gas turbine, ensures that the operations and controls constraints are met, and provides set points for high bandwidth actuation loops or controls. Therefore, the model based control combines the operations and controls in order to optimize the gas turbine transient and steady state operation.

In one aspect, the optimizer/controller 310 adjusts the operations model dynamically based on rules to optimize the performance of the gas turbine or may provide an interface by which the operations model can be adjusted. Likewise, the optimizer/controller 310 or the computing unit 300 may provide an interface by which the operations or control constraints may be adjusted as a part of dynamically designing the controls and operations of a gas turbine.

In another aspect, the prediction of the gas turbine engine states and the applicable constraints are performed by using a model based control. One example of a model based control is model predictive control (MPC). As would be recognized by those skilled in the art, model predictive control (MPC) encompasses computing or predicting the values of process inputs (including engine state or constraints values) over a prediction horizon in order that the operations model may be optimized using the most accurate estimates of the input values. The operations model can be described using any mathematical form and the constraints (whether related to the operation of the gas turbine engine or its control) may be separately provided or provided at the same time. Therefore, a set of input values are inputted into the optimizer/controller and the objective function is optimized using the measured or computed input values of the various engine state and constraint related parameters. Based on the optimization results, the control actions are generated to control the parameters of the gas turbine and the control action associated with the next time step is applied. It should be noted that only the next control action is implemented rather than the entire optimized input profile. By only implementing the next time step input control and repeating the process, performance can be improved even though there may be some errors in, the predictions. Therefore, the prediction, optimization, and control action generation are then repeated over the next time interval and so on.

Figure 4:
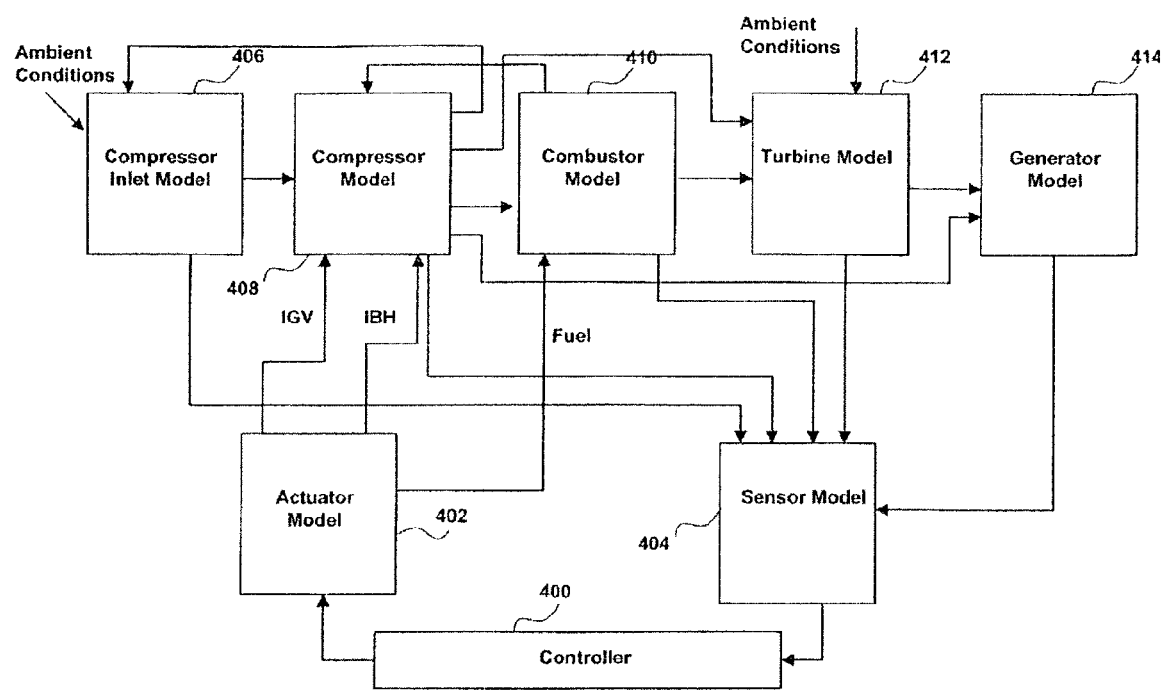
FIG. 4 is a block diagram illustrating the several models that may be used to implement a gas turbine model.

FIG. 4 discloses an exemplary simplified model of a gas turbine. It should be understood that FIG. 4 is exemplary only and those skilled in the art would recognize various modifications, alternatives, and variations all of which are considered as a part of the present invention. In the simplified model, the overall gas turbine model can be broken down into seven simpler models for analysis and control purposes. Accordingly, the gas turbine model includes (1) a compressor inlet model 406, (2) a compressor model 408, (3) a combustor model 410, (4) turbine model 412, (5) a generator model 414, (6) an actuator model (402), and (7) a sensor model 404. In addition, the model includes a controller 400 to coordinate the inputs, outputs, and processing based on these models.

Developing the equations and constraints to represent these models are within the abilities of those skilled in the art. FIGS. 5A–5C disclose exemplary equations (as examples of mathematical formulations) that can be used to model the compressor inlet model 406, the compressor model 408, and the combustor model 410. FIG. 6 provides a table of legends 601 that explains the terms used in the equations disclosed in FIGS. 5A–5C.

Therefore, as shown in FIGS. 5A–5C, the equations 508 provide an exemplary simplified representation of the compressor inlet model 406. The equations 504 provide an exemplary simplified representation of the compressor model 408. The equations 506 provide an exemplary simplified representation of a compressor heat soak model that is also a part of the compressor model 408. Likewise, equations 508 provide an exemplary simplified model of a compressor horsepower calculation that is also a part of the compressor model 408. Equations 510 provide an exemplary simplified model of the combustor model 410. Developing similar equations (or mathematical formulations) for the other models that make up a gas turbine model is within the abilities of those skilled in the art based on the disclosure herein.

In addition, to the mathematical equations representative of the operations of gas turbine, various constraints related to the operations and controls of the gas turbine also have to be identified. Several examples of the types of constraints that may be applied are described herein. However, as would be recognized by those skilled in the art, the list here is exemplary only and various other constraints could be defined. Some of the general constraints for the gas turbine model could include: a maximum load based on a rotor torque limitation imposed by the generator; and an acceleration limit based on a heat transfer limitation. A compressor related constraints can include a minimum inlet temperature based on air humidity to avoid icing. Some of the combustor related constraints can include: a limitation based on NOx and CO emissions limited by regulation; a lean blow out limitation on fuel/air mixture to prevent flame blow out; a shutdown flame-out limitation based on a maximum speed for unloading to avoid a flame loss. Some of the turbine related constraints can include a maximum limit of the hot gas path temperature and the exhaust temperature in order to maximize part life. The various actuators may also have constraints comprising a slew time limit. It should be understood that the above list of constraints is representative only and one skilled in the art would be able to define a suitable list of constraints for both operations and controls purposes with respect to the operations and controls of a gas turbine.

Figure 7:
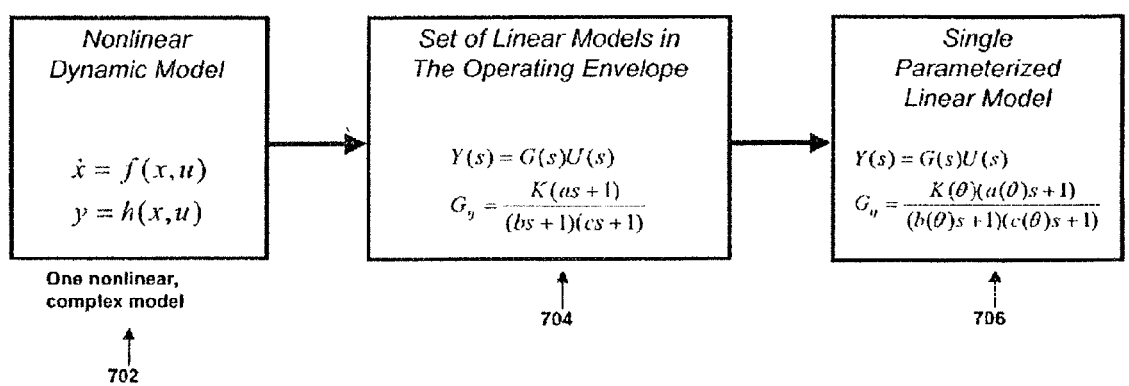
FIG. 7 is a diagram illustrating a process of simplifying a nonlinear dynamic model for computational purposes.
Figure 8:
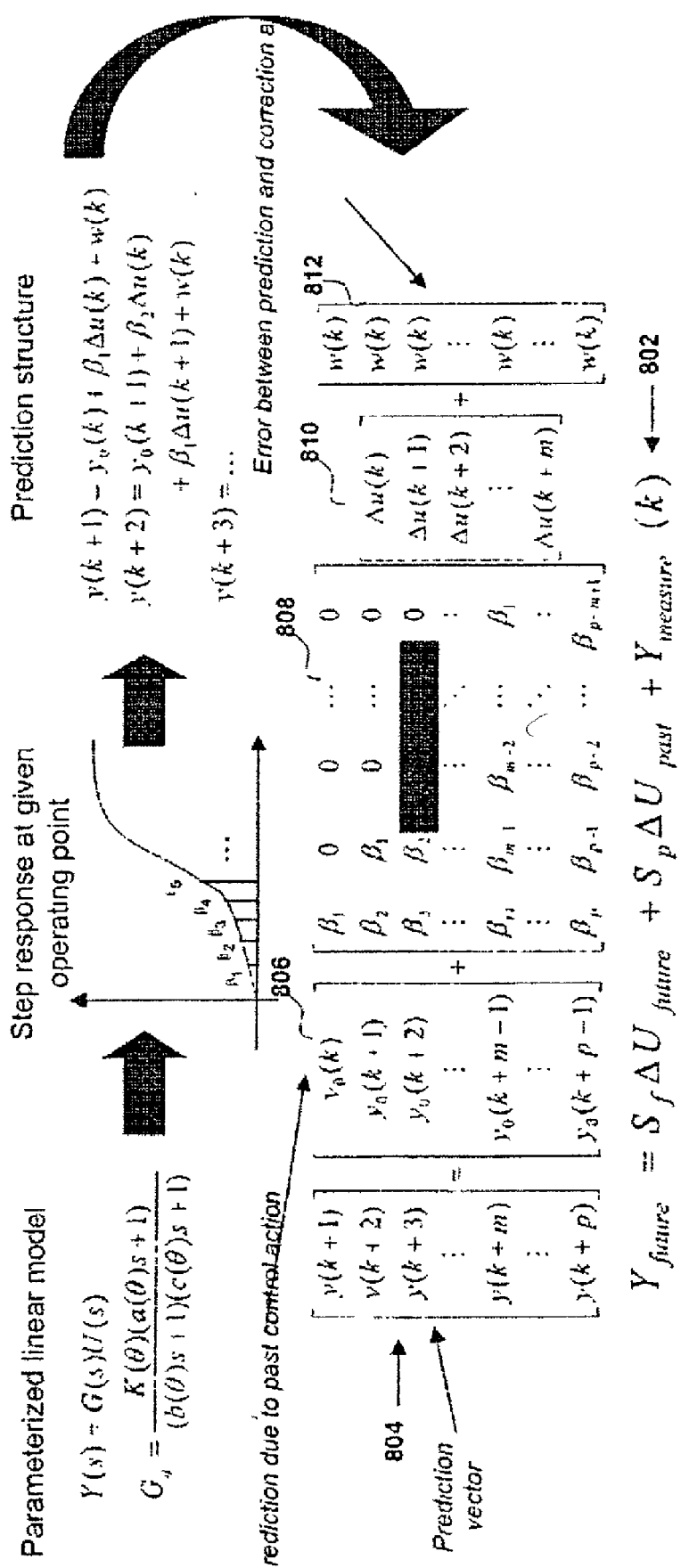
FIG. 8 is a diagram illustrating developing a prediction equation based on a parameterized linear model.
Figure 9:
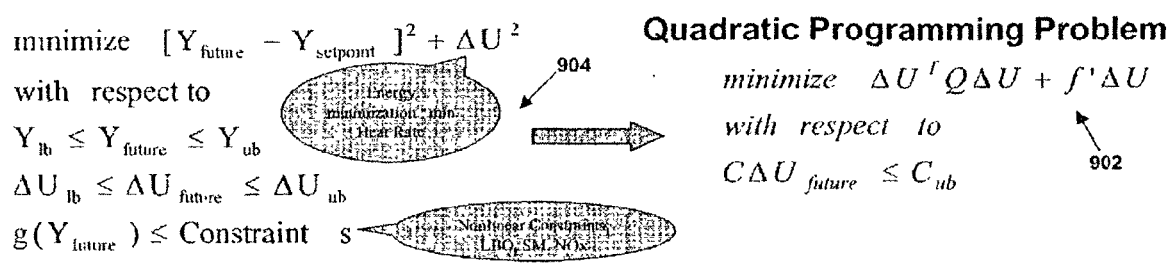
FIG. 9 illustrates the optimization process based on the predicted values to control the operations of the gas turbine.

FIGS. 7–9 illustrate a simplified process of optimizing a complex multivariable nonlinear dynamic model. As shown in FIG. 7, in the illustrated process, the complex nonlinear model 702 is broken down into a set of piece wise linear models 704 that are linear within a small part of the operating space or envelope of the nonlinear model. In block 706, the set of piecewise linear models are replaced or approximated by a single parameterized linear model that is computationally much easier to process efficiently. In these blocks, the "x" variables represent state related variables, the "u" variables represent the input related variables, while the "y" variables represent the output variables. Of course, those skilled in the art would recognize that the nonlinear model optimization techniques may be used instead if computationally feasible in the context of the operations and controls of a gas turbine.

FIG. 8 is a diagram illustrating developing a prediction equation 802 based on a parameterized linear model. As shown, the prediction vector 804 for particular prediction time interval is derived from the a prediction vector 806 based on prediction due to a past control action, a dynamic matrix 808 modifying a vector of past state values 810, and a vector 812 representing an error between the prediction and correction at the particular prediction time interval.

FIG. 9 illustrates an exemplary optimization process based on the predicted values to control the operations of the gas turbine. As shown by the formulation 904, the deviation of the predicted value Yfuture from a setpoint value is minimized while respecting the applicable constraints. For example, the predicted value Yfuture is limited between an upper and a lower bound. As shown by the formulation 902, this objective function can be optimized as a quadratic programming problem using optimization techniques that are within the abilities of those skilled in the art. Furthermore, it should be recognized that the simplification of the nonlinear model into a parameterized linear model is primarily for computational efficiency. Therefore, nonlinear optimization techniques may be used instead if they are computationally feasible in the context of the operations and controls of a gas turbine.

One skilled in the art would recognize that computing units and input units that comprise the system for design purposes provided herein may be connected through a general purpose electronic network, such as a computer network. The computing unit may include a computer system including a central processing unit (CPU) connected to a system memory. The system memory typically contains an operating system, a BIOS driver, and application programs and system programs. In addition, the computer system contains input devices such as a mouse or a keyboard, and output devices such as a printer and a display monitor. The computer system generally includes a communications interface, such as an Ethernet card, to communicate to the electronic network. Other computer systems may also connect to the electronic network which can be implemented as a Wide Area Network (WAN) or as an inter-network such as the Internet. Furthermore, such a computing system may be connected the components (for e.g., PLCs, real time clocks) of an industrial controller that controls a gas turbine are well known to those skilled in the art and are not described herein even though it is understood that they are also a part of the present invention.

One skilled in the art would recognize that the above describes a typical computer system connected to an electronic network. It should be appreciated that many other similar configurations are within the abilities of one skilled in the art and it is contemplated that all of these configurations could be used with the model based control for a gas turbine as discussed herein. Furthermore, it should be appreciated that it is within the abilities of one skilled in the art to program and configure a computing system or unit to implement the method steps discussed herein.

Other embodiments of the invention will be apparent to those skilled in the art from a consideration of the specification and the practice of the invention disclosed herein. It is intended that the specification be considered as exemplary only, with the true scope and spirit of the invention also being indicated by the following claims.

What is claimed is:

1. A method of designing the operations and controls of a gas turbine, comprising:
   generating an operations model for the gas turbine including at least one objective function;
   defining operations and control constraints for the operations model of the gas turbine;
   providing an online dynamic optimizer/controller that dynamically optimizes and controls operation of the gas turbine using model based control based on the operations model and the operations and control constraints.

2. The method according to claim 1, wherein the model based control comprises model predictive control.

3. The method according to claim 2, wherein the optimizer/controller performs following steps in a loop: (A) estimating the current engine state and applicable constraints; (B) for a given control/simulation time period, determining a control action by optimizing an objective function based on the operation model while respecting the applicable constraints; (C) executing the control action determined in step (B).

4. The method according to claim 3, wherein in step (B), determining a control action by optimizing an objective function comprises predicting the gas turbine engine states and applicable constraints.

5. The method according to claim 1, wherein the desired operations models include set points for various parameters based on the steady state and transient operations of the gas turbine.

6. The method according to claim 5, wherein the parameters comprise an inlet guide vane angle, an inlet bleed heat, and a fuel flow related values.

7. The method according to claim 1, wherein the dynamic optimizer uses sensors for computing measured values of various engine states or parameters related to the operations of the gas turbine.

8. The method according to claim 7, wherein the dynamic optimizer/controller uses software sensors for estimating unmeasured values of other parameters based on the measured values.

9. The method according to claim 1, wherein the operations model comprises a multivariable nonlinear model.

10. The method according to claim 9, wherein the optimizer/controller approximates the non linear model with a set of piece wise linear models for prediction and/or optimization purposes.

11. The method according to claim 2, wherein the optimizer/controller reduces the risk of constraint violation by proactive control actions responsive to the model predictive control results.

12. The method according to claim 1, wherein the optimizer modifies the objective function and the constraints are modifiable online to optimize operational results and/or compliance with applicable constraints.

13. The method according to claim 1, wherein the operations model is adjustable online based on the data from a specific machine.

14. The method according to claim 1, wherein the operations and control constraints are dynamically adjusted to optimize a tradeoff between competing objectives related to the operation of the gas turbine.

15. The method according to claim 14, wherein the constraints may be relaxed as a result of the tradeoff on risks related to the operation of the gas turbine.

16. The method according to claim 1, wherein the step of defining operations and control constraints comprises identifying one or more of combustion related constraints, compressor related constraints, hot gas path related constraints, minimum and maximum operating limit related constraints, control margin related constraints, and constraints related to actuators and sensors.

17. The method according to claim 1, wherein the controller portion of the optimizer/controller is configured to perform the following steps iteratively:
   receiving sensor inputs of measured values and computing other nonmeasured values based on the measured values;
   adjusting the operations model based on the input measured values and/or the computed nonmeasured values;
   computing engine state and constraints predicted values over a prediction horizon based on the input measured values and/or the computed nonmeasured values and the operations model;
   using the engine state and constraints predicted values to evaluate the objective function and constraints in order to generate control actions over a control horizon.

18. The method according to claim 1, wherein the operations model comprises a compressor inlet model, a compressor model, a combustor model, a turbine model, a generator model, a sensor model, and an actuator model.

19. The method according to claim 18, wherein each of the models comprises one or more mathematical equations.

20. The method according to claim 1, wherein the dynamic optimizer optimizes the objective function as a solution to a quadratic programming problem.

21. The method according to claim 1, wherein the dynamic optimizer comprises non linear model based optimization solutions.

22. A system for designing the operations and controls of a gas turbine, comprising:
   a computing unit with an input unit for generating an operations model for the gas turbine to include at least one objective function and for defining operations and controls constraints for the operations model of the gas turbine; and
   a dynamic online optimizer/controller configured to dynamically optimize and control operation of the gas turbine using model based control based on the operations model and the operations and control constraints.

23. The system according to claim 22, wherein the model based control comprises model predictive control.

24. The system according to claim 22, wherein the optimizer/controller is configured to perform the following steps in a loop: (A) estimating the current engine state and applicable constraints; (B) for a given control/simulation time period, determining a control action by optimizing an objective function based on the operation model while respecting the applicable constraints; and (C) executing the control action determined in step (B).

25. The system according to claim 24, wherein in step (B), determining a control action comprises predicting the gas turbine engine states and applicable constraints.

26. The system according to claim 22, further comprising sensors for measuring or computing measured values of various engine states or parameters related to the operations of the gas turbine.

27. The system according to claim 26, further comprising software sensors for estimating unmeasured values of other states or parameters based on the measured values.

28. The system according to claim 22, wherein the operations model comprises a multivariable nonlinear model.

29. The system according to claim 28, wherein the optimizer/controller is configured to approximate the nonlinear model with a set of piece wise linear models for prediction and/or optimization purposes.

30. The system according to claim 22, wherein the optimizer/controller is configured to reduce the risk of constraint violation by proactive control actions responsive to model predictive control results.

31. The system according to claim 22, wherein the optimizer/controller comprises an interface that allows the constraints to be modified online and the optimizer is configured to modify the objective function.

32. The system according to claim 22, wherein the optimizer/controller is configured to adjust the operations model online based on data from a specific machine.

33. The system according to claim 22 wherein the operations model comprises a compressor inlet model, a compressor model, a combustor model, a turbine model, a generator model, a sensor model, and an actuator model.

34. The system according to claim 22 wherein the controller portion of the optimizer/controller is configured to perform the following steps iteratively:

receiving sensor inputs of measured values and computing other nonmeasured values based on the measured values;

adjusting the operations model based on the input measured values and/or the computed nonmeasured values;

computing engine state and constraints predicted values over a prediction horizon based on the input measured values and/or the computed nonmeasured values and the operations model;

using the engine state and constraints predicted values to evaluate the objective function and constraints in order to generate control actions over a control horizon.

35. A computer readable data storage medium having program code stored thereon for designing the operations and controls for a gas turbine, the program code configured to cause a computing system to perform the following steps comprising:

generating an operations model for the gas turbine include at least one objective function;

defining operations and control constraints for the operations model of the gas turbine;

providing an online dynamic optimizer/controller that dynamically optimizes and controls operation of the gas turbine using model based control based on the operations model and the operations and control constraints.

36. The computer readable data storage medium according to claim 35, wherein the model based control comprises model predictive control.

* * * * *